US011775545B1

(12) United States Patent
Fritz et al.

(10) Patent No.: US 11,775,545 B1
(45) Date of Patent: Oct. 3, 2023

(54) CLOUD-BASED DATABASE FOR SPATIAL DATA LIFECYCLE MANAGEMENT

(71) Applicant: Amazon Technologies, Inc., Seattle, WA (US)

(72) Inventors: Jonathan Fritz, Seattle, WA (US); Omer Ahmed Zaki, Bellevue, WA (US); Yannis Papakonstantinou, La Jolla, CA (US)

(73) Assignee: Amazon Technologies, Inc., Seattle, WA (US)

( * ) Notice: Subject to any disclaimer, the term of this patent is extended or adjusted under 35 U.S.C. 154(b) by 234 days.

(21) Appl. No.: 17/030,171

(22) Filed: Sep. 23, 2020

(51) Int. Cl.
*G06F 16/00* (2019.01)
*G06F 16/25* (2019.01)
*G06F 16/2458* (2019.01)
*G06F 3/06* (2006.01)
*G06F 16/29* (2019.01)

(52) U.S. Cl.
CPC .......... *G06F 16/252* (2019.01); *G06F 3/0605* (2013.01); *G06F 3/067* (2013.01); *G06F 3/0649* (2013.01); *G06F 16/2458* (2019.01); *G06F 16/29* (2019.01)

(58) Field of Classification Search
None
See application file for complete search history.

(56) References Cited

U.S. PATENT DOCUMENTS

| | | | |
|---|---|---|---|
| 7,552,008 B2 | 6/2009 | Newstrom et al. | |
| 7,983,474 B2 | 7/2011 | Van Workum et al. | |
| 8,212,807 B2 | 7/2012 | Ingersoll et al. | |
| 8,427,505 B2 | 4/2013 | Karp et al. | |
| 8,442,963 B2 | 5/2013 | Irish et al. | |
| 8,799,074 B2 | 8/2014 | Simmons | |
| 8,909,264 B1 | 12/2014 | Higuchi et al. | |
| 8,970,694 B2 | 3/2015 | Dunkel et al. | |
| 9,118,579 B2 | 8/2015 | Cossins et al. | |
| 9,363,146 B2 | 6/2016 | Cossins et al. | |
| 9,424,291 B2 | 8/2016 | Shinn et al. | |
| 9,501,507 B1 | 11/2016 | Harris et al. | |
| 10,007,677 B1 | 6/2018 | Hines | |
| 10,187,268 B2 | 1/2019 | Cossins et al. | |
| 10,242,051 B2 | 3/2019 | Shinn et al. | |

(Continued)

OTHER PUBLICATIONS

Open Source Cloud-Based Technologies for BIM, Sotirios et al., (Year: 2018).*

(Continued)

*Primary Examiner* — Jean M Corrielus
(74) *Attorney, Agent, or Firm* — Robert C. Kowert; Kowert, Hood, Munyon, Rankin & Goetzel, P.C.

(57) ABSTRACT

Methods, systems, and computer-readable media for a cloud-based database for spatial data lifecycle management. A spatial database receives elements of spatial data from a plurality of clients of the distributed spatial database. An individual element of the spatial data comprises one or more location values or one or more spatial objects. The spatial database stores the plurality of elements of spatial data using a plurality of storage resources. The spatial database receives a query. The spatial database determines one or more elements of spatial data matching the query from the plurality of elements of spatial data that were stored using the plurality of storage resources.

20 Claims, 9 Drawing Sheets

(56) References Cited

U.S. PATENT DOCUMENTS

| | | | |
|---|---|---|---|
| 10,691,662 B1 | 6/2020 | Harris et al. | |
| 10,733,778 B2 | 8/2020 | Hong | |
| 2002/0078035 A1* | 6/2002 | Frank | G06F 16/954 |
| 2005/0091209 A1* | 4/2005 | Frank | G06F 16/9537 |
| 2006/0036588 A1* | 2/2006 | Frank | G06F 16/9537 |
| 2008/0228729 A1* | 9/2008 | Frank | G06F 16/954 |
| 2009/0282056 A1* | 11/2009 | Patel | G06F 16/29 |
| 2015/0112647 A1* | 4/2015 | Currin | H04L 67/10 |
| | | | 703/1 |
| 2015/0294422 A1* | 10/2015 | Carver | G06Q 40/08 |
| | | | 705/4 |
| 2015/0310360 A1* | 10/2015 | Currin | G06Q 50/06 |
| | | | 705/7.12 |
| 2019/0057109 A1* | 2/2019 | Albrecht | G06F 16/173 |
| 2019/0057110 A1* | 2/2019 | Albrecht | G06F 16/173 |
| 2020/0110952 A1* | 4/2020 | Gleeson-May | B60R 25/25 |
| 2020/0167360 A1* | 5/2020 | Rath | G06F 3/061 |
| 2020/0167361 A1* | 5/2020 | Princehouse | G06F 3/0649 |
| 2021/0149927 A1* | 5/2021 | Coorey | G06F 16/95 |
| 2021/0256065 A1* | 8/2021 | Behnen | G06F 16/2228 |

OTHER PUBLICATIONS

Robert Simmon, "A Gentle Introduction to GDAL, Part 1", Retrieved from https://medium.com/planet-stories/a-gentle-introduction-to-gdal-part-1-a3253eb96082, Apr. 2017, pp. 1-13.

Yannis Papakonstatinou, et al., "Announcing PartiQL: One query language for all your data", AWS Open Source Blog, Aug. 2019, pp. 1-8.

George Percivall, "OGC Open Geospatial APIs—White Paper," OGC Document 16-019r4, Open Geospatial Consortium, Feb. 2017, Retrieved from https://docs.opengeospatial.org/wp/16-019r4/16-019r4.html, pp. 1-23.

* cited by examiner

CLOUD-BASED DATABASE FOR SPATIAL DATA LIFECYCLE MANAGEMENT

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services or systems that interact with clients. For example, such distributed systems may provide database systems to clients. As the scale and scope of database systems have increased, the tasks of provisioning, administering, and managing system resources have become increasingly complicated. For example, the costs to search, analyze, and otherwise manage data sets can increase with the size and scale of the data sets.

Figure 1:
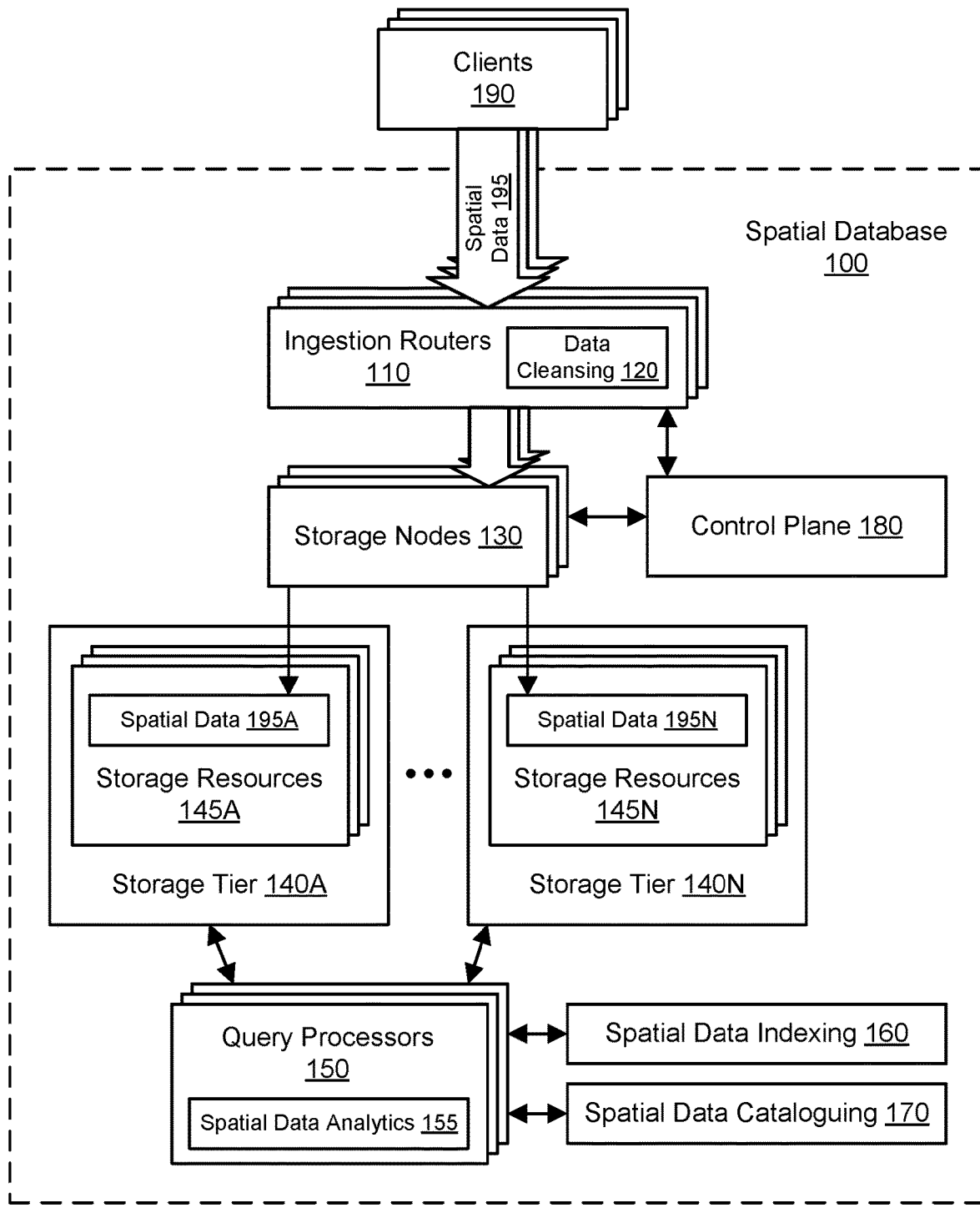
FIG. 1 illustrates an example system environment for a cloud-based database for spatial data lifecycle management, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Embodiments of methods, systems, and computer-readable media for a cloud-based database for spatial data lifecycle management are described. A spatial database hosted in the cloud may use automated techniques to manage spatial data across the lifecycle of the data, including ingestion, queries, analytics, and other lifecycle stages. The spatial database may be offered as a service of a cloud provider network to offer high availability and high throughput for both ingestion and queries of spatial data on behalf of multiple clients. Some queries may be performed in real-time or near-real-time after spatial data is ingested. Spatial data, also referred to as geospatial data, may include data about location, e.g., in the real world or in a virtual world. An element of spatial data may associate one or more geospatial coordinates or other location values (e.g., latitude and longitude, GPS coordinates, street addresses, and so on) that specify a physical location and may also include other data that describes characteristics of the specified location. An element of spatial data may include one or more spatial objects such as points, lines, polygons, areas, or other shapes. Prior approaches for managing spatial data have often attempted to combine disparate tools from different vendors, and the resulting combinations may not have been scalable for high throughput or available as a service to multiple clients. Additionally, prior approaches may have required significant manual effort by data scientists or administrators to customize off-the-shelf components for their needs. By automatically managing the entire lifecycle of spatial data using a distributed system that scales for high throughput, the spatial database described herein may ease the burden of spatial data management for individual clients and also provide performance advantages for operations such as ingestion, queries, and analytics.

The spatial database may include a plurality of components that are distributed across one or more networks, e.g., a cloud provider network that offers numerous services and resources. The spatial database may offer "serverless" functionality in which individual clients need not provision or manage the individual servers, routers, and other processors that perform lifecycle management. The spatial database may include a set of ingestion routers that receive and cluster spatial data for a given data set, e.g., for co-location in storage resources based (at least in part) on geospatial proximity. Upon ingestion, spatial data may be subjected to one or more cleansing functions. For example, erroneous location values (e.g., GPS coordinates) may be detected and corrected, or location values may be enriched with other data (e.g., adding postal codes to GPS coordinates). The spatial database may further include a set of storage nodes that process the spatial data. For example, the storage nodes may write elements of spatial data to one or more storage tiers, such as a "hot" tier that offers low-latency and high-availability write and read access to a set of distributed storage resources (e.g., as implemented using database clusters) and a "cold" tier that offers longer-term storage with higher latency of data retrieval. Spatial data may be migrated automatically from tier to tier, e.g., from the hot tier to the cold tier according to a retention policy based (at least in part) on the dates of individual spatial data elements.

The spatial database may further include a set of query processors that perform queries of the spatial data in the one or more storage tiers. The query processors may implement analytic functions for spatial data. Queries may be performed of spatial data stored internally by the spatial database along with spatial data (and other data) in external data sources (e.g., other storage services in the provider network). Data from multiple sources (e.g., one or more internal storage resources and one or more external data sources) may be joined, e.g., to generate maps showing a variety of layered features. The external data sources may include client-specific data sets, public data sets, and/or data sets that are selectively shared by an authoritative data source. The query processors or other components of the spatial database may perform automated placement of spatial data, e.g., to optimize query performance. For example, spatial data in an external data source may be migrated to internal storage resources based (at least in part) on analysis of one or more queries such that future queries are performed with lower latency.

As one skilled in the art will appreciate in light of this disclosure, embodiments may be capable of achieving certain technical advantages, including some or all of the following: (1) improving the availability and latency of a spatial database for ingestion; (2) improving the availability and latency of a spatial database for queries; (3) improving the availability and latency of a spatial database for analytics; (4) improving the quality and utility of ingested spatial data by using automated functions for error correction and/or data enrichment; (5) improving the latency of queries of spatial data in various sources by federating queries of multiple data sources and performing joins of the retrieved data; and so on.

FIG. 1 illustrates an example system environment for a cloud-based database for spatial data lifecycle management, according to some embodiments. A spatial database 100 may represent a fast, fully managed, and low-cost spatial database service enabling customers to query and process spatial data at petabyte scale. By simplifying the process required to ingest, process, store, and query spatial data, the spatial database 100 may make it easy for customers to update and utilize their spatial datasets, maps, and mobility solutions in real-time and also query historical spatial data. The spatial database 100 may enable customers to load and catalog spatial datasets, including both vector and raster data types, and seamlessly visualize their spatial data using visualization tools. The spatial database 100 may enable customers to build applications such as machine learning workloads on top of spatial data queries supported by the database. In some embodiments, the spatial database 100 may enable customers to quickly build spatial applications for geospatial analytics and mobility solutions with support for Open Geospatial Consortium (OGC) compliant application programming interfaces (APIs).

Spatial data 195 may include data that relates to location. The locations described by the spatial data 195 may relate to the real world or to one or more virtual worlds. An element of spatial data 195 may associate one or more geospatial coordinates or other location values (e.g., latitude and longitude, GPS coordinates, street addresses, and so on) that specify a physical location and may also include other data that describes characteristics of the specified location (or an item at the specified location). An element of spatial data 195 may include one or more spatial objects such as points, lines, polygons, areas, or other shapes. Spatial data 195 may be grouped by vector and raster data types. Vector data may include points, lines, and polygons within a spatial reference frame, such as latitude and longitude. Raster data may include pixel or grid cells with values to each pixel/cell. Raster data may be commonly used for satellite imagery, LiDAR point clouds, and temperature across geographic areas. Spatial data 195 may include spatiotemporal data that relates to time as well as location, e.g., such that data elements have timestamps or other indicators of position on a temporal axis. In some embodiments, a temporal dimension may be added to view how these spatial values change over time, thereby creating a multi-dimensional data structure or cube. In a variety of industries like automotive, robotics, advertising technology, agriculture, financial services, and logistics, customers are producing and storing vast amounts of spatial data at a growing rate. If a customer's use case involves the location of physical or virtual assets, tracking how items move over time, using the position and location of objects (e.g., buildings), leveraging remote sensing, or mapping, then utilizing spatial data 195 may be vitally important for that customer's application.

Spatial data 195 can require complex management across the lifecycle of the data. For example, industrial Internet of Things (IoT) and asset tracking customers may need to manage streaming spatial data ingestion, provide low-latency queries on real-time information, and run spatial queries at scale on vast amounts of historical information. Furthermore, some of these customers may store their spatial data 195 as part of larger datasets in a variety of Internet-accessible storage services, and these customers may have difficultly achieving the performance and scale required for their spatial queries. Other customers may require building, updating, and serving detailed, multi-layer maps in their applications, and such a requirement may necessitate time-consuming incremental map updates, generating and serving map tiles, and managing software for users to interact with their geographic data. Additionally, manually improving the accuracy of spatial information, such as noisy GPS signals, may be a time-consuming process. Finally, many spatial customers may need to catalog and manage large raster datasets of temporal remote sensing imagery, and they may need to deploy and manage a variety of open source machine learning, data science, and big data tools to gain insights and build predictive models.

Instead of requiring customers to create their own end-to-end systems to meet their particular spatial data needs, the spatial database 100 may perform automated lifecycle management for spatial data on behalf of customers. The spatial database 100 may be purpose-built to perform spatial queries at scale and at a fraction of the cost of other spatial solutions. The spatial database 100 may represent a fast, fully managed, low cost, and scalable spatial database service that simplifies the spatial data lifecycle, increases performance and scale for spatial analytics and data science, and provides functionality to quickly build spatial applications. The spatial database 100 may represent a serverless solution that removes the complexity of managing multiple components for spatial data ingest, real-time data cleansing, low-latency query, and large scale analytics. The spatial database 100 may enable customers to easily load, update, and catalog their spatial data, enrich it with seamless access to open datasets, and generate and serve map data types, such as vector and raster tile-mapping and map feature data.

The spatial database 100 may ingest and store spatial data 195 and make the stored data available for queries and other computations and tasks. In some embodiments, elements of the spatial data 195 may be received by the database 100 from one or more clients 190 over time, e.g., as one or more streams representing real-time updates of dynamic spatial data. In some embodiments, elements of the spatial data 195 may be received by the database 100 from one or more external data sources identified by clients 190, e.g., as a one-time or occasional import of more static spatial data. Clients 190 may represent various types of client devices that generate spatial data, offer access to spatial data, or otherwise provide spatial data in various data sets to the database 100. The spatial data 195 may be divided into different data sets. A particular data set of spatial data may be specific to one client, and the database 100 may perform ingestion of numerous data sets from numerous clients. After ingestion, data owned by one client may be stored separately from data owned by another client, e.g., using different storage resources, partitions, or other techniques to ensure the security and/or isolation of each client's data. A data set of spatial data may include numerous elements of spatial data. In some embodiments, within a given data set, the elements of spatial data may have the same schema or data types from element to element.

An element of spatial data 195 may include one or more location values. The location value(s) may relate to the real world or to one or more virtual worlds. For example, an element of spatial data may include one or more location values such as geospatial coordinates or values such as a latitude and a longitude, a set of Global Positioning System (GPS) coordinates, a street address, a ZIP code or postal code, and and/or other values that specify a physical location. A location value or set of location values in an element of spatial data 195 may represent a point, a set of points, or an area. An element of spatial data may also include other data that describes characteristics associated with the element at the specified location. For example, a company that manages a fleet of vehicles may use the spatial database 100 to keep track of location values (current and/or historical) for individual vehicles in the fleet. An element of spatial data in such a data set may include one or more location values, one or more identifiers of an individual vehicle, and potentially other data such as a timestamp. A data set of spatial data may include a set of values that change over time, such as locations of non-stationary objects, and such data elements may be timestamped or otherwise positioned along a temporal range such that the data represents spatiotemporal data.

The spatial data may include raster data. The spatial data may include vector data. An element of spatial data 195 may include vector data represented by one or more spatial objects. Spatial objects may include points, lines, polygons, curves, areas, or other geometric objects or shapes. For example, spatial objects may represent roads, outlines of human-made structures, natural or political boundaries, bodies of water, points of interest, and so on. A spatial object may be specified within a spatial reference frame in the real world (e.g., a latitude and longitude) or in a virtual world. An element of spatial data may also include other data that describes characteristics associated with the element. For example, a spatial object representing a building may be associated with a street address in an element of spatial data.

Client devices 190 that provide the spatial data 195 to the database 100 may be associated with various domains such as vehicles (including autonomous vehicles), Internet of Things (IoT) and "smart home" networks, distribution and logistics facilities, scientific research facilities, and so on. Some data sets may have millions of new data elements per day, e.g., as vehicles in a fleet provide updates for the current locations. To process large amounts of data efficiently, the spatial database 100 may be implemented using a distributed system and may be referred to as a distributed database. In order to efficiently ingest, transform, store, and/or query such large quantities of data, the distributed database 100 may employ scaling techniques while keeping the database online for continued ingestion and querying. By decoupling various stages of the distributed database 100 from each other, individual portions of the database may be scaled up or down (e.g., by a control plane 180) to make better use of computational and storage resources while permitting near-real-time ingestion and querying of spatial data. For example, the number of ingestion routers 110 may be dynamically increased in response to an increase in the volume of ingested data across one or more clients 190. As another example, additional storage resources for a data set of spatial data may be dynamically provisioned in response to an increase in the volume of ingested data in that data set. Similarly, resources may be downscaled at one or more stages of the spatial data lifecycle if the volume of data is observed to decrease. As yet another example, portions of a data set or an entire data set may be automatically migrated from one set of storage resources to another set of storage resources to lower the latency of storing and/or retrieving the data.

The database 100 may manage a large amount of spatial data throughout the lifecycle of the data. The spatial data 195 may be received at the database 100 using a fleet of hosts referred to as ingestion routers 110. For some data sets, the spatial data may typically arrive at the database 100 in time order, but the database may perform ingestion of out-of-order data as well. In some embodiments, the ingestion routers 110 may divide the data 195 from the clients 190 into ingestion partitions. In some embodiments, the ingested data for a given data set may be partitioned according to the location values of the data. In some embodiments, the ingested data for a given data set may be partitioned according to one or more tags associated with the data, the category to which the data belongs, and/or other suitable metadata. Because queries often operate on nearby data elements together, spatial data sets that are related (e.g., by physical proximity) may be clustered for co-location of storage in the database 100 so that the queries are performed more efficiently. Elements of spatial data may be co-located such that elements having one location value are stored nearby elements having nearby location values. For example, elements of spatial data for the same city, postal code, or other locale may be clustered such that elements having one location value are stored nearby elements having nearby location values. Ingested spatial data may be mapped to different partitions based on clustering in order to achieve better performance of data storage and retrieval.

In addition to the ingestion routers 110, the database 100 may include hosts such as storage nodes 130 and query processors 150. A fleet of storage nodes 130 may take the partitioned spatial data from the ingestion routers 110, potentially process the data in various ways, and add the data to one or more storage tiers 140A-140N. For example, the storage nodes 130 may write data to a "hot" storage tier 140A at a lower latency and to a "cold" storage tier 140N at a higher latency. In various embodiments, storage nodes may perform reordering, deduplication, aggregation, and other transformations on spatial data. By co-locating related spatial data using a clustering scheme, tasks such as aggregations may be optimized or otherwise have their performance improved.

The data 195 may be routed from the routers 110 to the storage nodes 130 according to routing metadata, e.g., that maps different data sets or partitions of spatial data to different storage nodes. In one embodiment, the storage nodes 130 may organize the data sets in tables. A table may store one or more data sets for a given client. A table may be a named entity that stores related elements of spatial data that are usable by the same application and often managed by the same customer of the database 100. A data point (e.g., an element) in a spatial data set may be stored in a record. Data points or elements of spatial data may be added to the database 100 using application programming interface (API) calls or other programmatic interfaces that are invoked by clients 190. In some embodiments, the same API may be used by multiple clients 190 to invoke functionality of the database 100. In some embodiments, a data element of spatial data may be associated with one or more location values or spatial objects, a timestamp, and one or more values representing characteristics of the element. Timestamps may be provided by clients or automatically added by the database 100 upon ingestion. In some embodiments, values in elements of spatial data may be used by the database 100 in generating aggregations such as min, max, average, and count. For example, a table related to vehicles may be identified by a unique combination of values for dimensions of a vehicle identification number (VIN) and location, while additional values may include the battery state and the miles traveled per day. In one embodiment, queries may specify time intervals along with individual location values or ranges of location values.

As shown in FIG. 1, the storage tier 140A may include one or more storage resources 145A usable to store spatial data 195A, and the storage tier 140N may include one or more storage resources 145N usable to store spatial data 195N. The various storage tiers 140A-140N may represent different use cases for spatial data. The storage tiers 140A-140N may differ in their performance characteristics, durability characteristics, and cost characteristics. For example, the database 100 may include a hot tier (such as tier 140A) that offers the lowest latency by storing recent spatial data in volatile memory resources (e.g., random access memory) 145A across a distributed set of nodes. As another example, the database 100 may include a cold tier that offers higher latency (but a lower cost) by storing a longer interval of spatial data using persistent storage resources 145N such as disk drives. The database 100 may include other tiers such as a warm tier that stores recent spatial data in nonvolatile storage resources (e.g., solid-state drives) across a distributed set of storages nodes, a frozen tier that stores even older spatial data in sequential access storage media, and so on. Based on their needs and budgets, users of the spatial database 100 may select and configure (e.g., using a control plane 180) one or more of the storage tiers 140A-140N for storage of their spatial data.

The database 100 may offer a control plane 180 that permits customers (e.g., developers of spatial applications, data scientists, and so on) and other systems to perform management and modeling of spatial data. For example, a component for spatial data management of the control plane 180 may offer APIs for creating, deleting, and listing tables (or entire databases); describing tables and policies; creating schemas for tables, including specifying the datatype for each column or field; creating and updating policies and associating policies with tables; and so on. In one embodiment, the database 100 may represent a container of tables and policies, such as retention policies. Policies may be applied at the database level for all tables or may be overridden for individual tables. The control plane 180 may permit users to define coordinate systems (e.g., GPS coordinates, latitude-longitude pairs, and so on) for their tables.

For vector data sets, the control plane 180 may permit users to define an ingestion pipeline, including a data source (e.g., a data stream or more static data source) and optional pre-defined or user-defined ingest processing functions. If a data ingest source was specified, the database 100 may automatically begin ingesting vector data into the table. For raster data sets (e.g., used to generate spatial imagery), the control plane 180 may permit users to define the parameters for the spatial asset catalog that serves as the metadata usable by the database 100 to access the raster data. The control plane 180 may also permit users to specify a data source for the raster data (e.g., a location or account with an external storage service). The database 100 may automatically begin ingesting raster data into the table, catalog the raster data, and convert it to an internal storage format such as cloud-optimized GeoTIFF.

Using a fleet of query processors 150, users may retrieve, share, process, and transform spatial data. Queries of spatial data may be performed for particular locations, location ranges or areas, spatial objects, points in time, time intervals, and/or other values (e.g., vehicle identifiers). Queries of spatial data may retrieve individual elements of spatial data. Queries of spatial data may include transformations of retrieved data, and the transformations may be performed by the query processors 150 or by other components or layers that sit on top of the query processors. Queries may include spatial queries that indicate spatial relationships. Spatial queries may seek one or more data elements or combinations of data elements that satisfy one or more spatial relationships for distance, relative position, intersection, or other indicators of proximity. For example, a particular spatial query may return a set of data elements that are within a specified distance from a particular point. In some embodiments, spatial data can be queried using PartiQL or a command-line interface (CLI) or API and processed using Geospatial Data Abstraction Libraries (GDAL/OGR) libraries. Query processors 150 may perform tasks such as one-time queries of spatial data in one or more storage tiers 140A-140N, transformations of spatial data, and other computations. To perform queries with lower latency, query processors 150 may reference a spatial data indexing component 160. The spatial data indexing 160 may represent one or more indices that are usable to quickly locate particular values (e.g., location values) in the storage resources 145A-145N. To facilitate queries, query processors 150 may reference a spatial data cataloguing component 170. The spatial data cataloguing 170 may represent metadata about spatial data 195A-195N, e.g., data describing high-level characteristics of different data sets. Queries may be requested by clients via an API or other programmatic interface. Complex spatial applications may be built on top of the query processing. For example, a mapping application may use one or more queries to retrieve the vector features and other relevant data (e.g., raster data representing satellite imagery) within a specified area. Using the retrieved data, the application may build a map showing various layers of features for the specified area.

In some embodiments, query processors 150 or other components of the database 100 may perform analytics 155 for spatial data. Using the analytics 155, the database 100 may enable specialized mathematical functions such as interpolation, approximation, and smoothing to be performed on spatial data, e.g., in order to find trends and patterns. By contrast, traditional relational database management systems or spatial data solutions may require developers to write complex application code in order to perform such functions. By interacting with the query processors 150, various applications may use the database 100 to perform analysis of spatial data. For example, machine learning and machine vision applications may use spatial data managed by the database 100. The spatial database 100 may extend the PartiQL query language with a set of Open Geospatial Consortium (OGC) compliant APIs for spatial queries on vector data. Additionally, the spatial database 100 may provide an interface with the Geospatial Data Abstraction Libraries (GDAL/OGR) for interacting with raster and vector data types.

In one embodiment, one or more components of the database 100, such as hosts 110, 130 and 150, other compute instances, and/or storage resources, may be implemented using resources of a provider network. The provider network may represent a network set up by an entity such as a private-sector company or a public-sector organization to provide one or more services (such as various types of network-accessible computing or storage) accessible via the Internet and/or other networks to a distributed set of clients. The provider network may include numerous services that collaborate according to a service-oriented architecture to provide resources such as the ingestion routers 110, storage nodes 130, storage resources 145A-145N, and/or query processors 150. The provider network may include numerous data centers hosting various resource pools, such as collections of physical and/or virtualized computer servers, storage devices, networking equipment and the like, that are used to implement and distribute the infrastructure and services offered by the provider. Compute resources may be offered by the provider network to clients in units called "instances," such as virtual or physical compute instances. In one embodiment, a virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

In various embodiments, one or more aspects of the database 100 may be implemented as a service of the provider network. The service that implements aspects of the database 100 may be part of a service-oriented system in which various services collaborate according to a service-oriented architecture via service interfaces to perform complex tasks. The service may be implemented using a plurality of different instances that are distributed throughout one or more networks, and each instance may offer access to the functionality of the service to various clients. Because resources of the provider network may be under the control of multiple clients (or tenants) simultaneously, the provider network may be said to offer multi-tenancy and may be termed a multi-tenant provider network. The provider network may be hosted in the cloud and may be termed a cloud provider network. Similarly, the spatial database 100 may be hosted in the cloud and may be termed a cloud-based spatial database. In one embodiment, portions of the functionality of the provider network, such as the database 100, may be offered to clients as a service in exchange for fees. The functionality of the database 100 may be accessible to clients using one or more APIs, programmatic interfaces, command-line interfaces (CLIs), graphical user interfaces (GUIs), or other service interfaces by which clients may request that the database perform various tasks.

Figure 8:
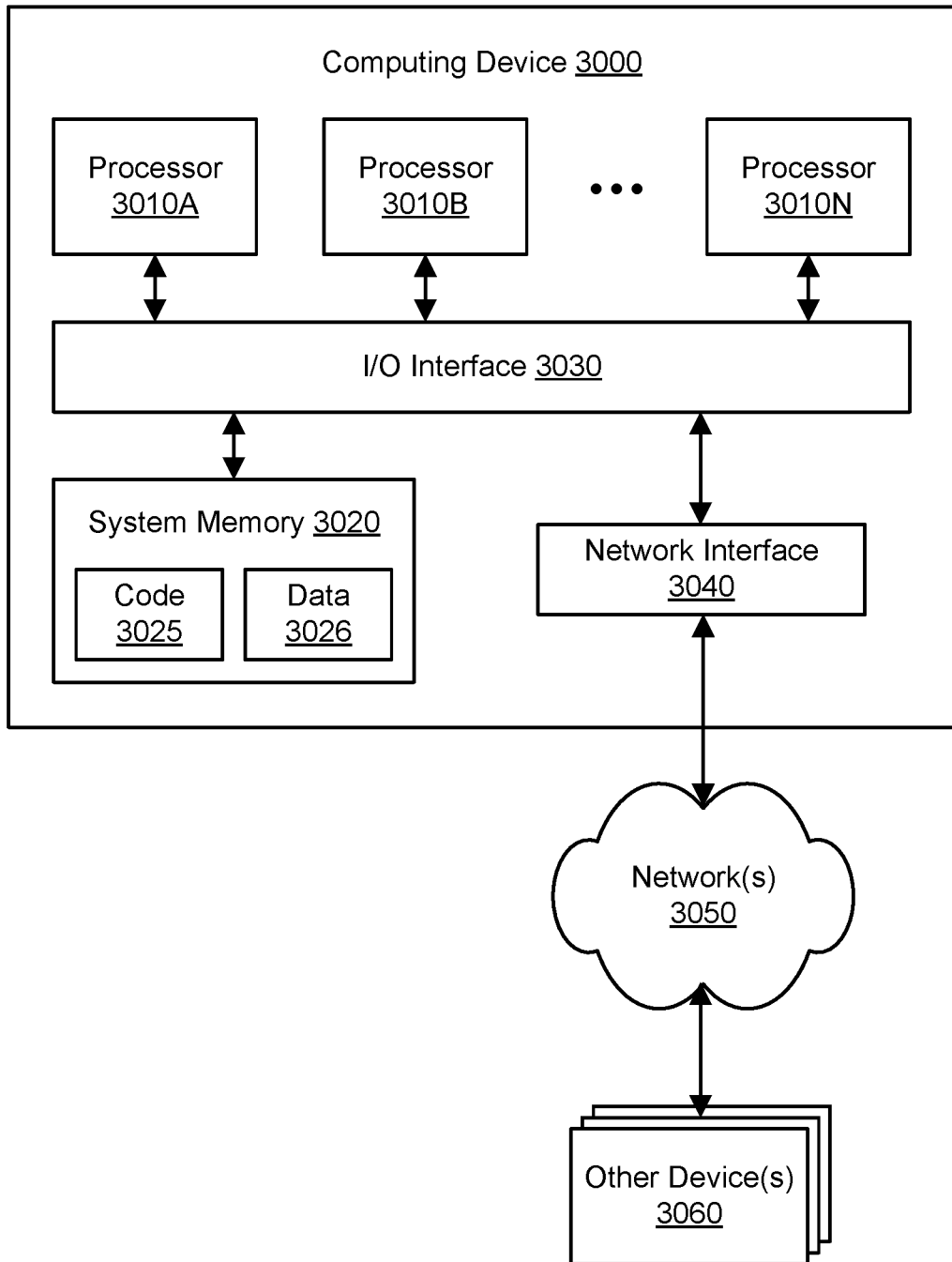
FIG. 8 illustrates an example computing device that may be used in some embodiments.

In various embodiments, components of the database 100, such as the ingestion routers 110, storage nodes 130, storage resources 145A-145N, query processors 150, and/or control plane 180 may be implemented using any suitable number and configuration of computing devices, any of which may be implemented by the example computing device 3000 illustrated in FIG. 8. In some embodiments, the computing devices may be located in any suitable number of data centers or geographical locations. In various embodiments, at least some of the functionality of the database 100 may be provided by the same computing device or by different computing devices. In various embodiments, if any of the components of the database 100 are implemented using different computing devices, then the components and their respective computing devices may be communicatively coupled, e.g., via one or more networks. Any of the components of the database 100 may represent any combination of software and hardware usable to perform their respective functions. In some embodiments, operations implemented by the database 100 may be performed automatically, e.g., without a need for user initiation or user intervention after an initial configuration stage, and/or programmatically, e.g., by execution of program instructions on at least one computing device. In some embodiments, the database 100 may include additional components not shown, fewer components than shown, or different combinations, configurations, or quantities of the components shown.

Clients 190 of the spatial database 100 may represent external devices, systems, or entities with respect to the database. Client devices 190 may be managed or owned by one or more customers of the database 100. For example, a particular customer may be a business that manages a fleet of vehicles, and computer systems in those vehicles may represent some of the client devices 190. In one embodiment, the client devices may be implemented using any suitable number and configuration of computing devices, any of which may be implemented by the example computing device 3000 illustrated in FIG. 8. Clients 190 may convey network-based service requests to the ingestion router fleet 110 via one or more networks, e.g., to supply streams or other updates of spatial data for storage in the storage tiers 140A-140N. The network(s) may encompass any suitable combination of networking hardware and protocols necessary to establish network-based communications between client devices 190 and the spatial database 100. For example, the network(s) may generally encompass the various telecommunications networks and service providers that collectively implement the Internet. In one embodiment, the network(s) may also include private networks such as local area networks (LANs) or wide area networks (WANs) as well as public or private wireless networks. For example, both a given client device and the spatial database 100 may be respectively provisioned within enterprises having their own internal networks. In one embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the spatial database 100. In one embodiment, client devices may communicate with the spatial database 100 using a private network rather than the public Internet. In various embodiments, the various components of the spatial database 100 may also communicate with other components of the spatial database using one or more network interconnects.

Figure 2:
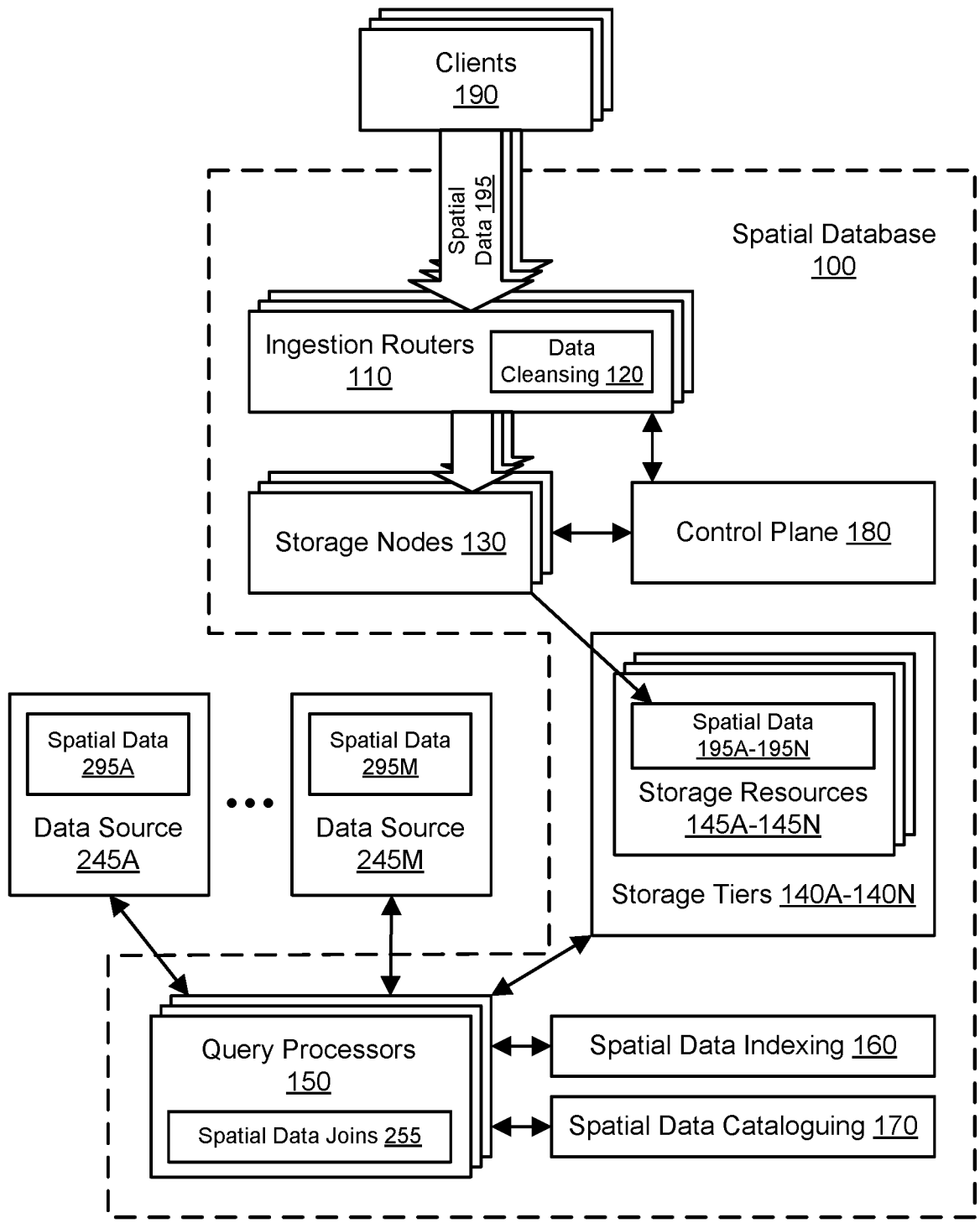
FIG. 2 illustrates further aspects of the example system environment for a cloud-based database for spatial data lifecycle management, including the use of the database to query spatial data in external data sources, according to some embodiments.

FIG. 2 illustrates further aspects of the example system environment for a cloud-based database for spatial data lifecycle management, including the use of the database to query spatial data in external data sources, according to some embodiments. In some embodiments, queries may be performed of spatial data 195A-195N stored internally by the spatial database (e.g., in one or more of storage tiers 140A-140N) along with spatial data in one or more external data sources such as data sources 245A-245M. In some embodiments, queries may be performed of spatial data 195A-195N stored internally by the spatial database (e.g., in one or more of storage tiers 140A-140N) along with other (not necessarily spatial) data in one or more external data sources such as data sources 245A-245M. The spatial data indexing 160 and spatial data cataloguing 170 may reflect the contents of the external data sources 245A-245M. In some embodiments, the control plane 180 may permit users to specify an external data source, and the database 100 may then crawl the external data, recommend a schema, and automatically catalog the data for availability using queries. Updates to the data in the external data source may be automatically captured in the catalog 170.

In some embodiments, the query processors 150 may perform spatial data joins 255 to combine the internally stored data with the externally stored data. For example, spatial data from one or more internal storage resources 145A-145N and one or more external data sources 245A-245M may be joined to generate maps showing a variety of layered features. As another example, spatial data from one or more internal storage resources 145A-145N and non-spatial data from one or more external data sources 245A-245M may be joined to enrich the spatial data, e.g., by providing additional (non-spatial) attributes of vehicles within a particular locale. In some embodiments, a query interface external to the query processors 150 may perform the spatial data joins 255. Using these techniques, the query processors 150 or external query interface may enable federated queries to facilitate the use of disparate data sets by clients.

The external data sources 245A-245M may store spatial data 295A-295M and/or non-spatial data using storage resources that are not under the direct management or control of the spatial database 100. One or more of the external data sources 245A- 245M may represent other storage services in the provider network, such as one or more database management services, one or more services that provide bucket-based storage, one or more services that provide block-based storage, and so on. One or more of the external data sources 245A-245M may be external to the provider network that hosts the spatial database 100. The external data sources 245A-245M may include spatial data 295A-295M (and potentially non-spatial data) in one or more client-specific data sets, public data sets, and/or data sets that are selectively shared with particular users or user groups. For example, the external data sources 245A-245M may include one or more governmental or public repositories of authoritative spatial data such as satellite imagery, road maps, relief maps, weather data, climate data, and so on. By allowing queries to be federated using multiple data sources, the spatial database 100 may facilitate access to such repositories of spatial data.

Figure 3A:
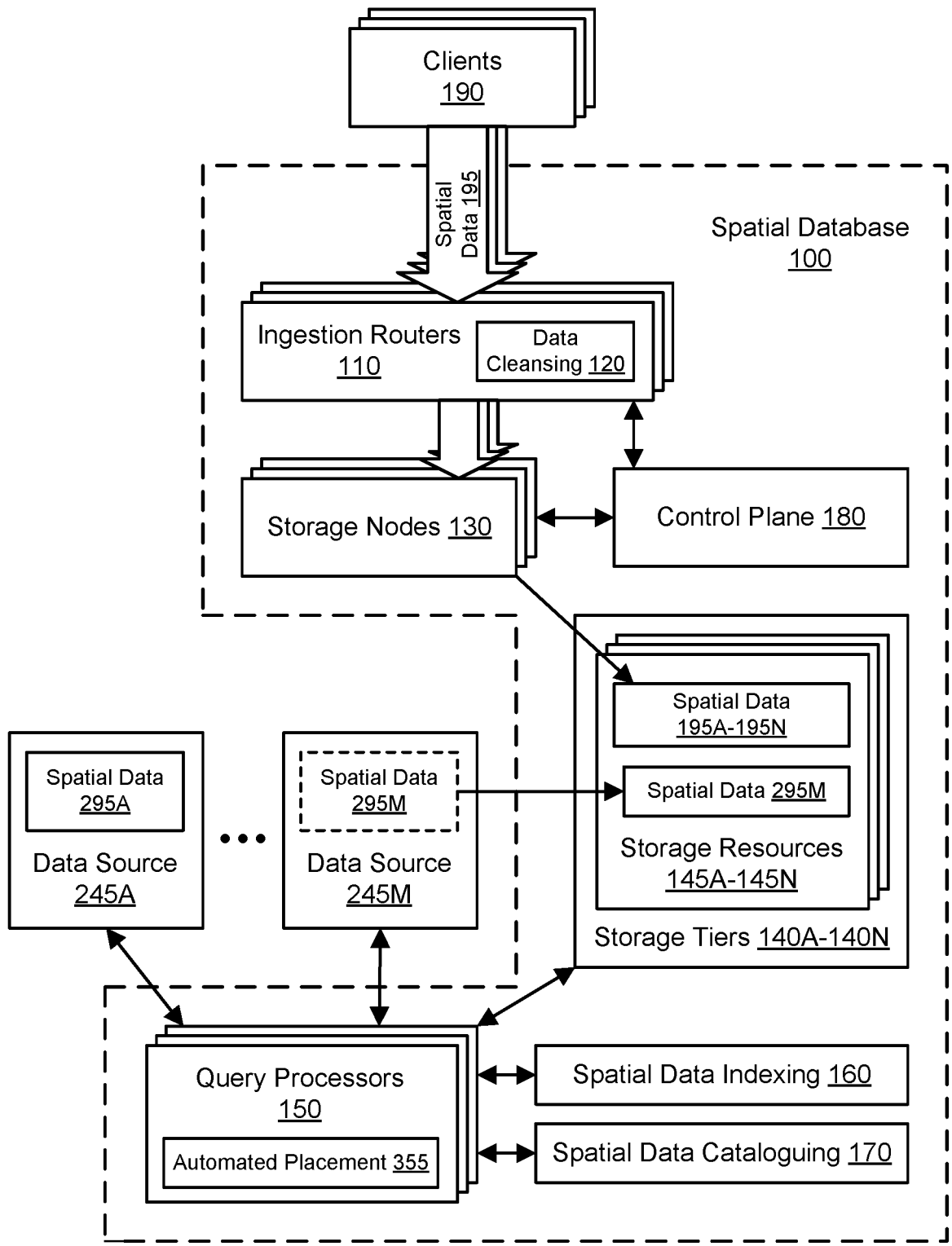
FIG. 3A and FIG. 3B illustrate further aspects of the example system environment for a cloud-based database for spatial data lifecycle management, including automated placement of spatial data among internal and external storage resources for optimization of query performance, according to some embodiments.
Figure 3B:
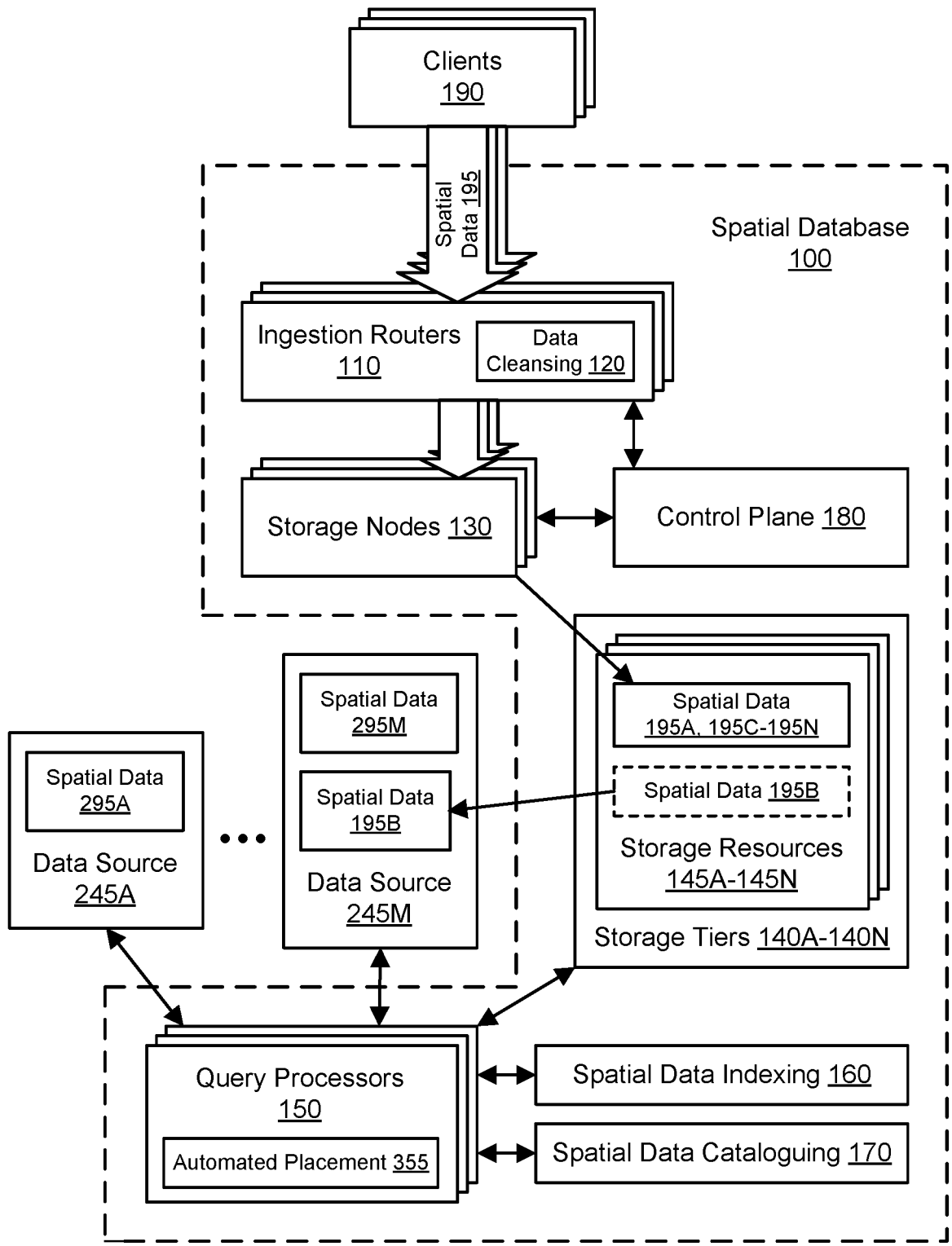

FIG. 3A and FIG. 3B illustrate further aspects of the example system environment for a cloud-based database for spatial data lifecycle management, including automated placement of spatial data among internal and external storage resources for optimization of query performance, according to some embodiments. The query processors or other components of the spatial database may perform automated placement 355 of spatial data. The automated placement 355 may select one or more locations at which to store all or part of one or more data sets of spatial data. The selected location(s) may include the internal storage resources 145A-145N as well as one or more of the external data sources 245A-245M. In some embodiments, the automated placement 355 of spatial data may be performed to optimize query performance. In some embodiments, the automated placement 355 of spatial data may be performed based (at least in part) on automated analysis of one or more queries, one or more performance metrics associated with data retrieval, and/or one or more resource usage metrics associated with data storage. Data may be migrated based (at least in part) on analysis of performance characteristics of one or more prior queries such that future queries are performed with lower latency. For example, as shown in FIG. 3A, if latency for a series of queries of spatial data 295M exceeded a threshold value, then that data may be migrated to internal storage resources 145A-145N for lower latency of future queries.

Data may be migrated based (at least in part) on analysis of one or more resource usage characteristics such that data is stored with improved resource usage. For example, as shown in FIG. 3B, if spatial data 195B is infrequently updated, then that data may be migrated to external data source 245M such that a cost to store the migrated data is reduced. The internal storage resources 145A-145N continue to store spatial data 195A and 195C-195N.

Figure 4:
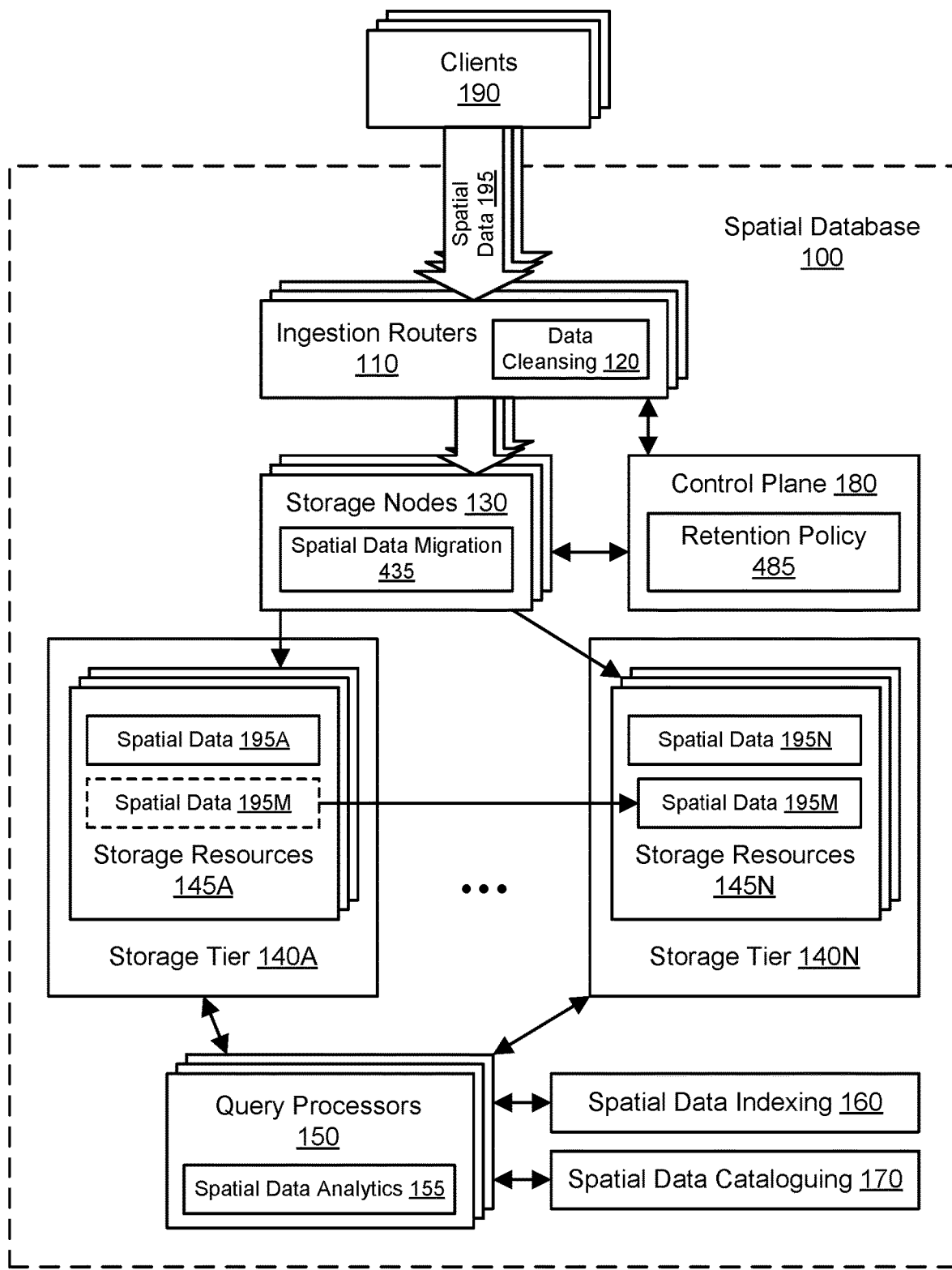
FIG. 4 illustrates further aspects of the example system environment for a cloud-based database for spatial data lifecycle management, including migration of spatial data from one storage tier to another storage tier, according to some embodiments.

FIG. 4 illustrates further aspects of the example system environment for a cloud-based database for spatial data lifecycle management, including migration of spatial data from one storage tier to another storage tier, according to some embodiments.

As discussed above, the various storage tiers 140A-140N may represent different use cases for spatial data. The storage tiers 140A-140N may differ in their performance characteristics, durability characteristics, and cost characteristics. In some embodiments, spatial data may be migrated automatically from tier to tier, e.g., from the hot tier to the cold tier. The spatial data migration 435 may be performed automatically by the storage node 130 or other component(s) of the database 100. For example, as shown in FIG. 4, spatial data 195M may be migrated from storage tier 140A to storage tier 140N such that the data 195M is copied to storage resources 145N and removed from storage resources 145A. Spatial data migration 435 may include reformatting or reorganizing the migrated data to meet requirements of the destination.

The spatial data migration 435 may be performed according to application of a retention policy 485. The retention policy 485 may be based (at least in part) on the dates of individual spatial data elements. For example, the retention policy 485 may determine the time interval for which an element of spatial data is kept in a particular tier; beyond that time interval, the spatial data may expire and may be deleted from the tier and/or copied to another tier. Different tiers may differ in their retention policies for spatial data. Tables and clients may also differ in their retention policies. In one embodiment, for example, the database 100 may have default retention periods of three hours for the hot tier and one year for the cold tier. In one embodiment, costs may be assessed to clients for the use of the database 100 to store their spatial data, and the per-measure costs assessed for the hot tier may be greater than the per-measure costs for the cold tier. Accordingly, using the control plane 180, customers may adjust the retention policies to reach a balance between performance (e.g., query latency) and cost.

Figure 5:
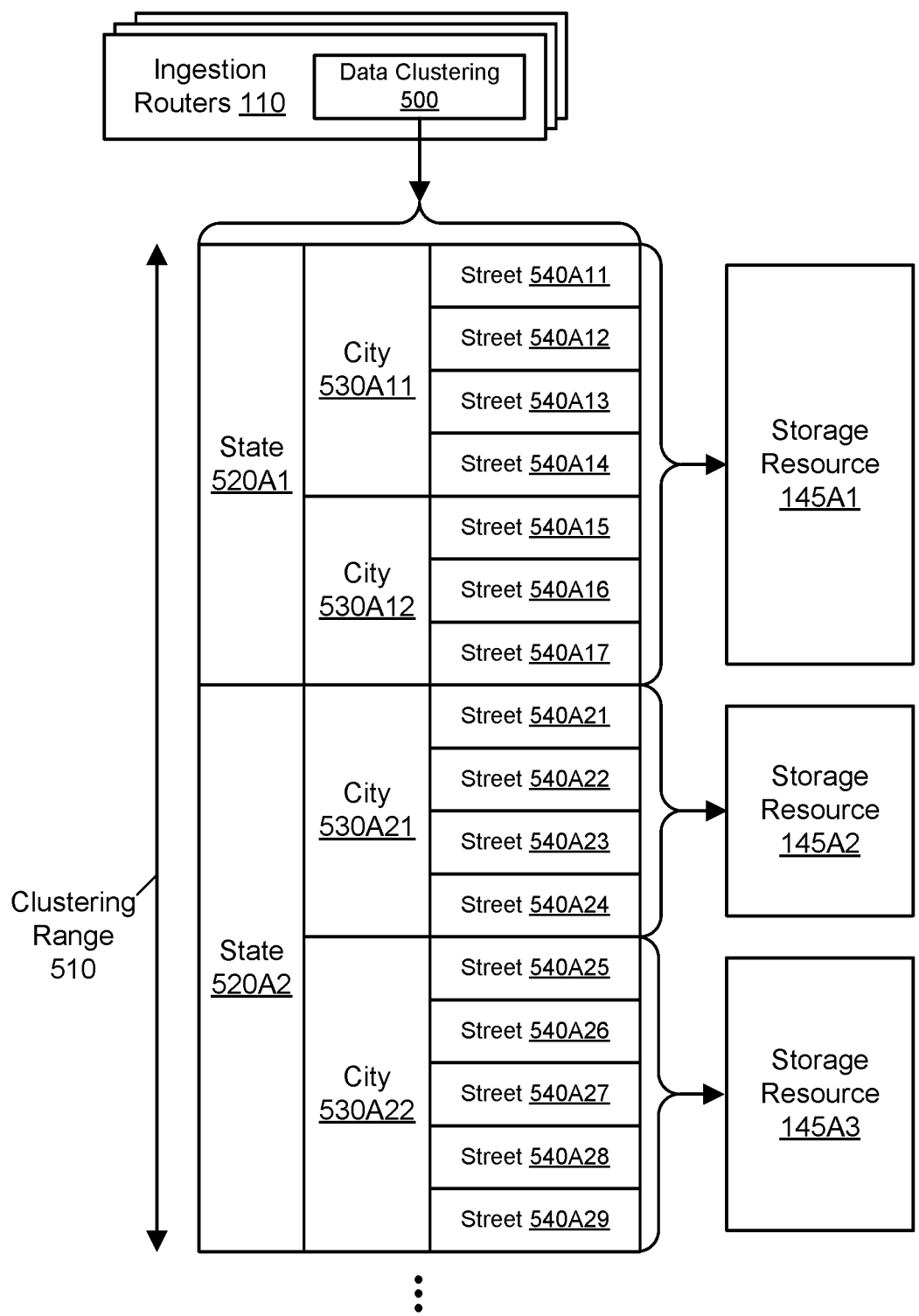
FIG. 5 an example of spatial data clustering by a spatial database for spatial data co-location and optimization of query performance, according to some embodiments.

FIG. 5 an example of spatial data clustering by the database for spatial data co-location and optimization of query performance, according to some embodiments. The ingestion routers 110 may perform data clustering 500 according to a clustering scheme to divide the ingested data 195 into various partitions or subsets. The clustering scheme may be used for co-location of related data sets or data elements in storage for optimization of queries and other tasks. To implement the data clustering 500, the ingestion routers 110 may organize spatial data along a clustering range 510. The clustering range may be based (at least in part) on dimensions for individual data elements that are derived from ingested data 195 and not necessarily formally specified by customers. For example, a clustering range for a particular table may be determined based (at least in part) on one or more dimensions representing location values of differing granularity or specificity: a continent or other large region, a nation, a state within a nation, a county or city, a postal code, a street address, a set of GPS coordinates, a latitude and longitude, and so on. The dimensions may be organized in a hierarchy, e.g., with dimensions representing larger areas (e.g., state) higher in the hierarchy than dimensions representing smaller areas (e.g., street address). In one embodiment, the clustering scheme may represent a default scheme that is intended to optimize query performance for a large number (e.g., a majority) of queries for a given table. In one embodiment, the clustering scheme may be selected by a customer, e.g., on a table-by-table basis.

Using the spatial data clustering 500, related elements of spatial data in one or more data sets may be placed near each other throughout their lifecycle in the spatial database 100. For example, as shown in FIG. 5, elements of spatial data having location values indicating one state 520A1 may be clustered together, while other elements of spatial data having location values indicating another state 520A2 may be clustered together. For the state 520A1, elements of spatial data having location values indicating one city 530A11 may be clustered together, while other elements of spatial data having location values indicating another city 530A12 may be clustered together. Similarly, for the state 520A2, elements of spatial data having location values indicating one city 530A21 may be clustered together, while other elements of spatial data having location values indicating another city 530A22 may be clustered together. Within a given city, elements of spatial data having location values indicating a particular street may be clustered together. For example, data elements for city 530A11 may be clustered according to values for streets 540A11, 540A12, 540A13, and 540A14; data elements for city 530A12 may be clustered according to values for streets 540A15, 540A16, and 540A17; data elements for city 530A21 may be clustered according to values for streets 540A21, 540A22, 540A23, and 540A24; and data elements for city 530A22 may be clustered according to values for streets 540A25, 540A26, 540A27, 540A28, and 540A29. Various portions of these data elements may be assigned to various storage resources 145A1, 145A2, and 145A3 in order to co-locate elements of spatial data based (at least in part) on their proximity with nearby elements of spatial data.

Using the clustering 500, various portions of a data set that have nearby location values (e.g., at the lowest levels of granularity) may be clustered together in the storage resources 145A-145N and throughout their lifecycle in the database 100. The use of such clustering 500 may achieve a higher degree of compression for spatial data as well as lower latency for queries. The clustering range 510 or hierarchy of geospatial measures may be specified by clients 190 or may be inferred automatically. The ingestion routers 110 may tag incoming data points so that related data sets are co-located properly. Such a clustering scheme may be used at various stages of the database 100 (e.g., at both the ingestion routers 110 and storage nodes 130) to enforce the clustering and co-location of neighboring data elements.

Figure 6:
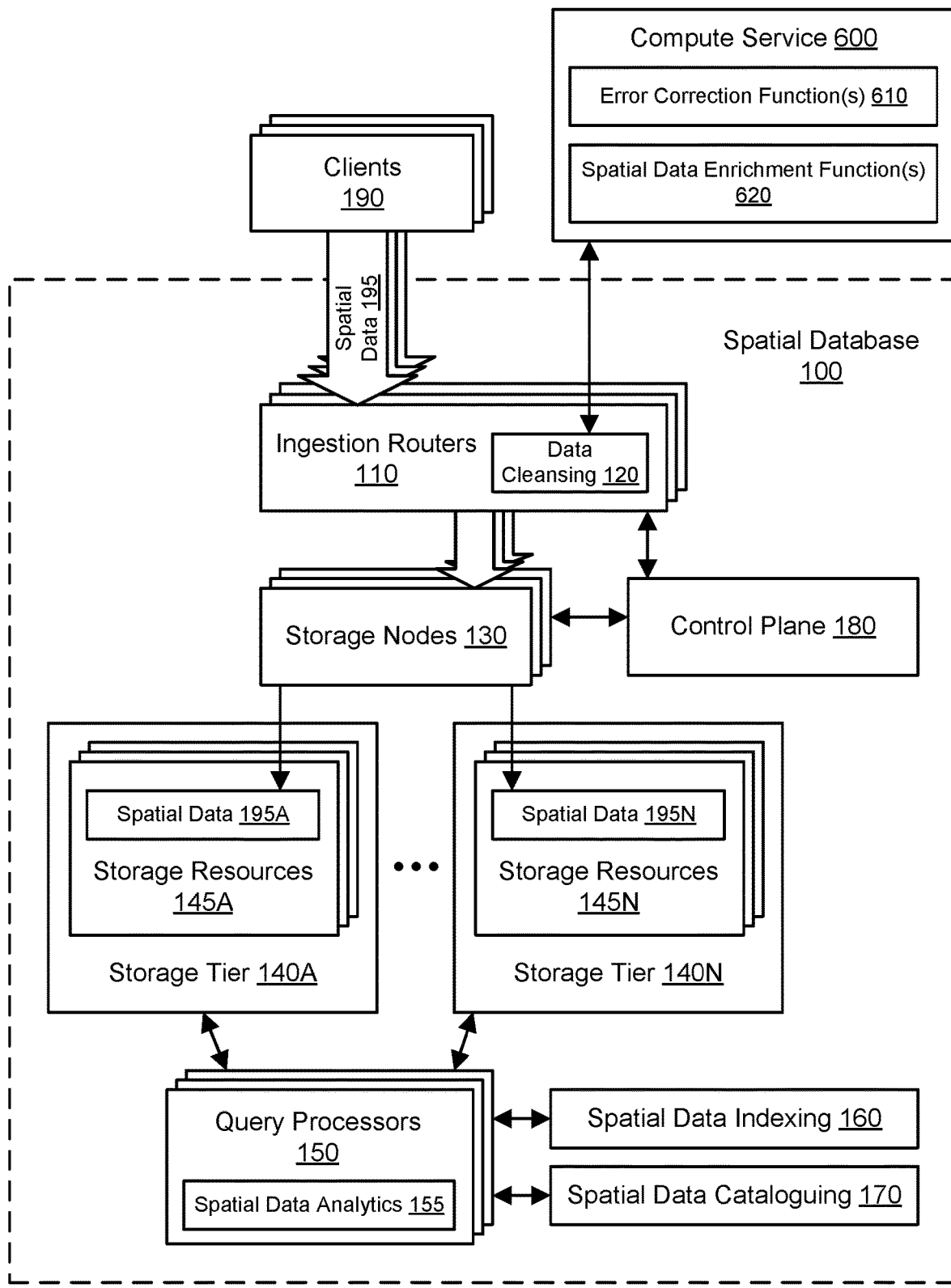
FIG. 6 illustrates further aspects of the example system environment for a cloud-based database for spatial data lifecycle management, including the use of a compute service to perform data cleansing functions for ingested spatial data, according to some embodiments.

FIG. 6 illustrates further aspects of the example system environment for a cloud-based database for spatial data lifecycle management, including the use of a compute service to perform data cleansing functions for ingested spatial data, according to some embodiments. Upon ingestion, spatial data 195 may be subjected to data cleansing 120 using one or more cleansing functions to modify or augment values in ingested data elements. In some embodiments, aspects of the data cleansing 120 may be performed by the ingestion routers 110 themselves. In some embodiments, aspects of the data cleansing 120 may be performed by one or more external services. For example, a serverless compute service 600 may execute or otherwise perform arbitrary computations that are specified by clients, and the service may do so such that clients need not provision or manage individual computing resources. To perform data cleansing 120, functions to be executed by the compute service 600 may be specified or provided by the ingestion routers 110 and/or other data cleansing 120 component(s) of the database 100. Aspects of the data cleansing 120 may be performed in real-time or near-real-time as elements of spatial data are ingested and before the elements are stored using the storage resources 145A-145N.

Data cleansing 120 may represent one or more modifications of one or more elements of spatial data to facilitate better use of the data, e.g., for queries and/or analytics. In some embodiments, the compute service 600 and/or other data cleansing 120 component(s) may execute one or more error correction functions 610 for ingested spatial data. Using the error correction function(s) 610, erroneous location values (e.g., GPS coordinates) may be corrected. Such erroneous location values may be detected using checks such as sanity tests. For example, if a stream of timestamped location updates for a particular vehicle suddenly indicate a faraway location and then back to the original location, the database 100 may determine that the faraway location is erroneous and should be corrected using the error correction function(s) 610. In some embodiments, the error correction function(s) 610 may be used to correct data formatting errors or otherwise enforce schemas. In some embodiments, the compute service 600 and/or other data cleansing 120 component(s) may execute one or more spatial data enrichment functions 620 for ingested spatial data. Using the spatial data enrichment function(s) 620, data elements may be enriched or augmented by adding additional location values or other values. For example, ZIP codes or postal codes may be added to elements of spatial data that have GPS coordinates or latitude-longitude pairs. By enriching spatial data on ingestion in this manner, the data may be more easily queried or subjected to analytics without requiring more complex queries and joins from different data sources.

Figure 7:
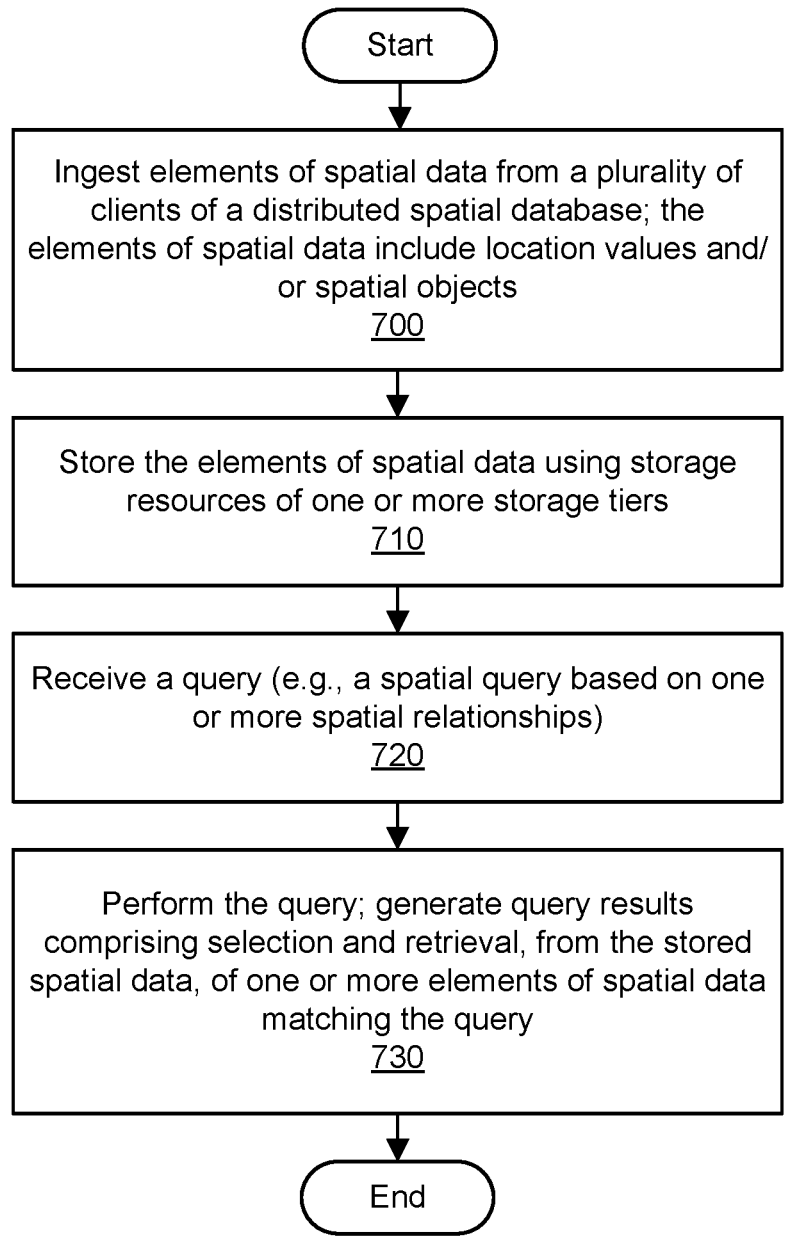
FIG. 7 is a flowchart illustrating a method for using a cloud-based database for spatial data lifecycle management, according to some embodiments.

FIG. 7 is a flowchart illustrating a method for using a cloud-based database for spatial data lifecycle management, according to some embodiments. As shown in 700, elements of spatial data may be ingested by a spatial database. The spatial data may be provided by a plurality of clients of the database. The spatial data may be ingested by one or more ingestion routers. In some embodiments, elements of the spatial data may be received by the database from one or more clients over time, e.g., as one or more streams representing real-time updates of dynamic spatial data. In some embodiments, elements of the spatial data may be received by the database from one or more external data sources identified by clients, e.g., as a one-time or occasional import of more static spatial data. An element of spatial data may include one or more location values or spatial objects. For example, an element of spatial data may include one or more location values indicating a point or an area in the real world or in a virtual world, such as a latitude and a longitude, a set of GPS coordinates, a street address, a ZIP code or postal code, and and/or other values that specify a physical location. As another example, an element of spatial data may include one or more spatial objects such as points, lines, polygons, curves, areas, or other geometric shapes. An element of spatial data may include a temporal value such as a timestamp. An element of spatial data may also include other data that describes characteristics associated with the element. For example, a company that manages a fleet of vehicles may use the spatial database to keep track of location values (current and/or historical) for individual vehicles in the fleet. In some embodiments, the ingested data for a given data set may be partitioned according to the location values of the data.

As shown in 710, the elements of spatial data may be stored using storage resources of one or more storage tiers. The various storage tiers may represent different use cases for spatial data. The storage tiers may differ in their performance characteristics, durability characteristics, and cost characteristics. For example, the database may include a hot tier that offers the lowest latency by storing recent spatial data in volatile memory resources (e.g., random access memory) across a distributed set of nodes. As another example, the database may include a cold tier that offers higher latency (but a lower cost) by storing a longer interval of spatial data using persistent storage resources such as disk drives. A particular data set of spatial data may be specific to one client, and data owned by one client may be stored separately from data owned by another client, e.g., using different storage resources, partitions, or other techniques to ensure the security and/or isolation of each client's data. Spatial data sets that are related (e.g., by physical proximity) may be clustered for co-location of storage in the database so that the queries are performed more efficiently. Elements of spatial data may be co-located such that elements having one location value are stored nearby elements having nearby location values.

As shown in 720, a query may be received, e.g., by a query processor. The query may be specified by a user via an appropriate interface. The query may seek query results representing individual elements of the spatial data. The query may indicate one or more values or ranges of values in the query results. For example, the query may indicate a range of locations, e.g., as measured by GPS coordinates. As another example, the query may indicate non-spatial values such as one or more vehicle identification numbers (VINs) for vehicles in a fleet. In some embodiments, spatial data can be queried using PartiQL or a command-line interface (CLI) or API and processed using GDAL/OGR libraries. Queries may include spatial queries that indicate spatial relationships. Spatial queries may seek one or more data elements or combinations of data elements that satisfy one or more spatial relationships for distance, relative position, intersection, or other indicators of proximity. For example, a particular spatial query may return a set of data elements that are within a specified distance from a particular point or a set of data elements within a particular cell in a grid.

As shown in 730, the query may be performed to generate query results. The query results may represent selection and retrieval, from the spatial data stored by the database, of one or more elements of spatial data (or portions of such elements) that match the query. The query results may include one or more transformations of retrieved data. In some embodiments, queries may be performed of spatial data stored internally by the spatial database along with spatial data or other data in one or more external data sources. Spatial data indexing and spatial data cataloguing may reflect the contents of the external data sources. In some embodiments, a query processor may perform a spatial data join to combine the internally stored data with the externally stored data. For example, spatial data from one or more internal storage resources and one or more external data sources may be joined to generate maps showing a variety of layered features. As another example, spatial data from one or more internal storage resources and non-spatial data from one or more external data sources may be joined to enrich the spatial data, e.g., by providing additional (non-spatial) attributes of vehicles within a particular locale.

Illustrative Computer System

In at least some embodiments, a computer system that implements a portion or all of one or more of the technologies described herein may include a computer system that includes or is configured to access one or more computer-readable media. FIG. 8 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 8 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   a spatial database comprising one or more ingestion routers, a plurality of storage resources, and one or more query processors, wherein the spatial database is offered to a plurality of clients as a service of a provider network comprising a plurality of services accessible via the Internet, and wherein the spatial database comprises one or more processors and one or more memories to store computer-executable instructions that, when executed, cause the one or more processors to:
   receive, by the one or more ingestion routers from the plurality of clients of the spatial database, a plurality of elements of spatial data, wherein an individual element of the spatial data comprises one or more location values indicating a physical location and one or more additional values;
   store the plurality of elements of spatial data using the plurality of storage resources of the spatial database;

receive, by the one or more query processors, a spatial query indicating one or more spatial relationships;

select one or more additional elements of spatial data matching the spatial query from a plurality of additional elements of spatial data stored using one or more data sources external to the spatial database; and generate one or more query results comprising a selection of one or more elements of spatial data matching the spatial query from the plurality of elements of spatial data stored using the plurality of storage resources and the additional elements of spatial data from the external data sources.

2. The system as recited in claim 1, wherein a first element of the spatial data comprising a first location value and a second element of the spatial data comprising a second location value are co-located using the plurality of storage resources based at least in part on a spatial proximity of the first location value and the second location value.

3. The system as recited in claim 1, wherein the one or more memories store additional computer-executable instructions that, when executed, cause the one or more processors to:

join the one or more elements of spatial data matching the spatial query and the one or more additional elements of spatial data matching the spatial query.

4. The system as recited in claim 1, wherein another individual element of the spatial data comprises one or more spatial objects.

5. A method, comprising:

receiving, by a spatial database, a plurality of elements of spatial data from a plurality of clients of the spatial database, wherein an individual element of the spatial data comprises one or more location values indicating a physical location or one or more spatial objects;

storing, by the spatial database, the plurality of elements of spatial data using a plurality of storage resources;

receiving, by the spatial database, a query;

retrieving, by the spatial database, one or more additional elements of spatial data matching the query from a plurality of additional elements of spatial data stored using one or more data sources external to the spatial database; and determining, by the spatial database, one or more elements of spatial data matching the query from the plurality of elements of spatial data stored using the plurality of storage resources.

6. The method as recited in claim 5, wherein a first element of the spatial data comprising a first location value and a second element of the spatial data comprising a second location value are co-located using the plurality of storage resources based at least in part on a spatial proximity of the first location value and the second location value.

7. The method as recited in claim 5, further comprising:

joining, by the spatial database, the determined one or more elements of spatial data matching the query and the retrieved one or more additional elements of spatial data matching the query.

8. The method as recited in claim 7, further comprising:

migrating, by the spatial database based at least in part on analysis of the query, the one or more elements of spatial data matching the query to the external one or more data sources; or migrating, by the spatial database based at least in part on the analysis of the query, the one or more additional elements of spatial data matching the query to the plurality of storage resources.

9. The method as recited in claim 5, wherein the plurality of storage resources comprise a first storage tier and a second storage tier, wherein the first storage tier and the second storage tier differ in one or more performance characteristics, and wherein the method further comprises:

migrating, by the spatial database, at least a portion of the plurality of elements of spatial data from the first storage tier to the second storage tier based at least on part on application of a retention policy, wherein the retention policy is applied based at least in part on temporal values associated with the plurality of elements of spatial data.

10. The method as recited in claim 5, further comprising:

correcting, by the spatial database, one or more erroneous location values in the spatial data based at least in part on execution of one or more functions.

11. The method as recited in claim 5, further comprising:

adding, by the spatial database, one or more additional location values to one or more of the elements of spatial data based at least in part on execution of one or more functions.

12. The method as recited in claim 5, wherein the spatial database is offered to the plurality of clients as a service of a provider network comprising a plurality of services accessible via the Internet.

13. The method as recited in claim 5, wherein the plurality of clients comprise a first client and a second client, wherein the plurality of elements of spatial data comprise a first subset provided by the first client and a second subset provided by the second client, wherein the first subset is stored separately from the second subset in the plurality of storage resources, wherein the query is provided by the first client, and wherein the one or more elements of spatial data matching the query are selected from the first subset and not from the second subset.

14. The method as recited in claim 5, wherein the one or more spatial objects comprise one or more points, one or more lines, or one or more polygons.

15. One or more non-transitory computer-readable storage media storing program instructions that, when executed on or across one or more processors, perform:

receiving, by a distributed spatial database, a plurality of elements of spatial data from a plurality of clients of the distributed spatial database, wherein the distributed spatial database is offered to the plurality of clients as a service of a provider network comprising a plurality of services accessible via the Internet, and wherein an individual element of the spatial data comprises one or more location values indicating a physical location or one or more spatial objects;

storing, by the distributed spatial database, the plurality of elements of spatial data using a plurality of storage resources;

receiving, by the distributed spatial database, a spatial query indicating one or more spatial relationships;

retrieving, by the distributed spatial database, one or more additional elements of spatial data matching the spatial query from a plurality of additional elements of spatial data stored using one or more data sources external to the distributed spatial database; and determining, by the distributed spatial database, one or more elements of spatial data matching the spatial query from the plurality of elements of spatial data stored using the plurality of storage resources.

16. The one or more non-transitory computer-readable storage media as recited in claim 15, wherein a first element of the spatial data comprising a first location value and a second element of the spatial data comprising a second location value are co-located using the plurality of storage resources based at least in part on a proximity of the first location value and the second location value.

17. The one or more non-transitory computer-readable storage media as recited in claim 15, further comprising additional program instructions that, when executed on or across the one or more processors, perform:
  joining, by the distributed spatial database, the determined one or more elements of spatial data matching the spatial query and the retrieved one or more additional elements of spatial data matching the spatial query.

18. The one or more non-transitory computer-readable storage media as recited in claim 17, further comprising additional program instructions that, when executed on or across the one or more processors, perform:
  migrating, by the distributed spatial database based at least in part on analysis of the spatial query, the one or more elements of spatial data matching the spatial query to the external one or more data sources; or
  migrating, by the distributed spatial database based at least in part on the analysis of the spatial query, the one or more additional elements of spatial data matching the spatial query to the plurality of storage resources.

19. The one or more non-transitory computer-readable storage media as recited in claim 15, wherein the plurality of storage resources comprise a first storage tier and a second storage tier, wherein the first storage tier and the second storage tier differ in one or more performance characteristics, and wherein the one or more non-transitory computer-readable storage media further comprise additional program instructions that, when executed on or across the one or more processors, perform:
  migrating, by the distributed spatial database, at least a portion of the plurality of elements of spatial data from the first storage tier to the second storage tier based at least on part on application of a retention policy, wherein the retention policy is applied based at least in part on temporal values associated with the plurality of elements of spatial data.

20. The one or more non-transitory computer-readable storage media as recited in claim 15, wherein the plurality of clients comprise a first client and a second client, wherein the plurality of elements of spatial data comprise a first subset provided by the first client and a second subset provided by the second client, wherein the first subset is stored separately from the second subset in the plurality of storage resources, wherein the spatial query is provided by the first client, and wherein the one or more elements of spatial data matching the spatial query are selected from the first subset and not from the second subset.

* * * * *